United States Patent Office 3,231,536
Patented Jan. 25, 1966

3,231,536
PREPARATION OF ACRYLONITRILE GRAFT
COPOLYMER FIBER-FORMING SYSTEMS
John F. Voeks, Concord, Calif., assignor to The Dow
Chemical Company, Midland, Mich., a corporation of
Delaware
No Drawing. Filed Sept. 26, 1962, Ser. No. 226,736
13 Claims. (Cl. 260—29.6)

This invention relates to a method for the preparation of improved fiber-forming systems comprising polymeric substances and aqueous, polyacrylonitrile-dissolving zinc chloride solutions that are adapted to provide fibers having excellent dye receptivity and to the compositions which may be thereby obtained.

For purposes of enhancing and upgrading the dyeability of fibers and the like articles based on normally difficult to dye acrylonitrile polymers, such as polyacrylonitrile, it is advantageous to incorporate dye-assisting adjuvants in the polymer composition in order to render it receptive to dyestuffs. A variety of techniques may be employed for incorporating dye-assisting adjuvants in such compositions. Amongst the best of the dye-assisting adjuvants for acrylonitrile polymer compositions, particularly polyacrylonitrile, are the poly-N-vinyl lactams, particularly N-vinyl-2-pyrrolidone. One of the most advantageous forms in which such dye-assisting adjuvants may be incorporated in the acrylonitrile polymer composition is to prepare a graft copolymer of acrylonitrile or a mixture of monomers containing predominant proportions of acrylonitrile on an already formed N-vinyl lactam polymer trunk or substrate.

Graft copolymers are usually formed by dissolving a preformed polymer and a polymerizable monomer in a mutual solvent and then polymerizing the monomer in the presence of the already formed "backbone" polymer substrate. Thus, acrylonitrile or monomeric acrylonitrile-containing mixtures will form dye-receptive copolymers when they are polymerized in the presence of such N-vinyl lactam polymers as poly-N-vinyl-2-pyrrolidone.

A highly advantageous technique for the preparation of acrylonitrile polymer fibers and the like and related shaped articles (including filaments, strands, yarns, tows, threads, cords and other funicular structures, ribbons, tapes, films, foils, sheets and the like, hereinafter illustrated as fibers) is to spin them in the manner of conventional wet-spinning operations by means of salt-spinning procedures using aqueous saline solutions of zinc chloride for the purpose. Thus, fiber-forming polymeric solutions or other spinnable dispersions of fiber-forming acrylonitrile polymers in polyacrylonitrile-dissolving aqueous solutions of zinc chloride may advantageously be extruded into non-polymer-dissolving coagulating spin bath solutions of the zinc chloride. In such salt spinning, as is well known, the extruded polymer assumes a hydrated or aquagel form upon coagulation and remains in such form as a shaped article until it has finally been irreversibly dried to the desired characteristically hydrophobic, synthetic polymer structure. In such aquagel or water swollen forms of the polymer, the quantity of water is generally at least gravimetrically equal to the hydrated polymer contained therein. It may oftentimes be preferable for the water to polymer weight ratio in an aquagel to be in the neighborhood of from 1.5:1 to 2.0:1, respectively, although aquagel structures in which the water-to-polymer ratio is as high as 5 to 1 may also be satisfactorily employed.

When zinc chloride is utilized for salt spinning of acrylonitrile polymer compositions, it is generally desirable for the polyacrylonitrile-dissolving solvent used in the spinning composition to contain at least about 55 weight percent of zinc chloride based on the weight of the solution. A polyacrylonitrile-solvent solution comprised of about 60 parts by weight of zinc chloride and about 40 parts by weight of water may be utilized with especial advantage in a spinnable composition. The quantity of zinc chloride in the non-polymer dissolving coagulating baths may advantageously be between about 40 and 45 percent by weight. Salt spinning operations with zinc chloride solvents may most advantageously be performed following the procedure and direction of United States Letters Patent No. 2,790,700.

The common method of preparing polymers for spinning involves the separate preparation of a solid polymer, usually in a liquid medium; followed by isolation, drying and comminution of the polymer and subsequent dissolution thereof in a suitable solvent medium. The advantages of utilizing a single medium for both polymerization and spinning without requiring intermediate isolation of the polymer product are quite obvious. Fiber-forming acrylonitrile polymers which are directly prepared in spinnable compositions using aqueous saline solvents for the purpose are disclosed in United States Letters Patent No. 2,425,192. Such a procedure, however, is not satisfactory for the preparation of graft copolymers of acrylonitrile or acrylonitrile-containing monomer mixtures on N-vinyl lactam polymer substrates, particularly when zinc chloride solutions are being employed. This is because of the insolubility of the N-vinyl lactam polymers in polyacrylonitrile-dissolving aqueous solutions of zinc chloride. Thus, when an N-vinyl lactam polymer is intended to be graft copolymerized in an aqueous zinc chloride polyacrylonitrile-dissolving medium, it is generally necessary to physically reduce the size of the preformed N-vinyl lactam polymer to extreme fineness in order to enable it to be dispersed in the medium in which the acrylonitrile monomer is polymerizing so that graft copolymer products may be obtained. In effect, such a procedure requires the polymerizing acrylonitrile monomer and the preformed N-vinyl lactam polymer to be in separate phases during the polymerization. In addition, suitable size reduction of the preformed N-vinyl lactam polymer is normally quite difficult and usually involves painstaking and tedious procedures.

It would be an advantage, and it is the principal object of the present invention, to provide a method for the preparation of graft copolymers of acrylonitrile or mixtures of acrylonitrile with other monomers directly in aqueous polyacrylonitrile-dissolving solutions of zinc chloride without encountering difficulties due to the insolubility of the already formed N-vinyl lactam polymer in order to provide more uniform and better quality graft copolymer containing compositions that are excellently suited for direct preparation into fibers and the like shaped articles by means of conventional salt spinning techniques.

It would also be an advantage and, accordingly, it is also an object of the invention, to provide the improved spinnable compositions having better uniformity and stability than heretofore obtained graft copolymers of acrylonitrile on N-vinyl lactam polymer substrates dispersed in aqueous saline solvents for polyacrylonitrile.

Additional objects and advantages will be apparent throughout the description and specification which follows.

According to the present invention, improved fiber-forming systems comprised of graft copolymers of acrylonitrile or acrylonitrile-containing monomer mixtures on N-vinyl lactam polymer substrates, particularly poly-N-vinyl-2-pyrrolidone, may be obtained by acidifying the aqueous polyacrylonitrile-dissolving zinc chloride solution with an inorganic acid that does not precipitate the zinc or introduce other adverse actions such as oxidation; then dissolving in the acidified saline solution an N-vinyl lactam polymer and acrylonitrile or a mixture of acrylonitrile and another monoethylenically unsaturated monomeric material capable of copolymerizing with acrylonitrile to provide fiber-forming polymeric products; then polymerizing the dissolved monomeric material in the presence of the dissolved N-vinyl lactam polymer to form a fiber-forming graft copolymer-containing polymeric substance in spinnable dispersion in said acidified aqueous, polyacrylonitrile-dissolving zinc chloride solution.

The compositions thus obtained are comprised of polymers and/or copolymers of the monoethylenically unsaturated acrylonitrile-containing monomeric material and graft copolymers thereof with the N-vinyl lactam polymer which are excellently dispersed, and may even be dissolved, in spinnable, fiber-forming condition in the aqueous zinc chloride solvent solution. The compositions thus obtained may advantageously be spun or extruded directly as they are prepared, generally in a manner pursuant to conventional salt-spinning techniques, or they may otherwise be cast or formed directly into fibers and other shaped structures and articles having excellent properties and characteristics with very good dye-receptivity due to the incorporation of the N-vinyl lactam polymer substrate in the graft copolymer product as a dye-assisting adjuvant. Further, the N-vinyl lactam polymer adjuvant is contained in fibers and the like prepared from compositions of the present invention in a more permanent and positively retained manner than when it is incorporated therein by mere physical blending techniques, despite its considerable solubility in water and other solvents.

As indicated, the graft copolymer-containing polymeric compositions are directly obtained in a condition siutable for spinning with excellent and stable distribution throughout the composition and exceptional resistance to separation therefrom prior to their extrusion into desired shaped articles. The compositions obtained, as indicated, may be actually dissolved depending upon the quantity of graft copolymer present. In any event, they are obtained in the form of very fine dispersions having many of the characteristics of true emulsions due to the presence of the graft copolymer in the aqueous saline phase as spherical particles in the form characteristic of liquid droplets when it is not actually soluble in the solvent medium.

Preferably, as mentioned, the monoethylenically unsaturated monomeric material which is employed for forming the graft copolymer is acrylonitrile. As indicated, mixtures of desired monomeric substances which are soluble in aqueous, polyacrylonitrile-dissolving zinc chloride solutions, particularly mixtures containing predominant proportions of acrylonitrile, may also be employed in order to form copolymeric substances along with the graft copolymer. It is advantageous for the monoethylenically unsaturated monomeric material to comprise at least about 80 weight percent of the polymerizable and graft copolymerizable ingredients employed, including the quantity of N-vinyl lactam polymer present, based on the total weight of interpolymerizable monomeric and polymeric constituents present in the system. Preferably, a sufficiency of acrylonitrile is employed to insure that the resulting polymerized substance, including the graft copolymer which is formed, contains in the polymerized substance product at least about 80 weight percent of acrylonitrile. Other monomeric materials which may be employed advantageously with acrylonitrile in the practice of the present invention include allyl alcohols, vinyl acetate, methacrylamide, methyl acrylate, 2-vinyl pyridine, dimethyl aminoethyl acrylate, methacrylonitrile, acrylic acid, itaconic acid, vinyl acetic acid, ethyl acrylate, fumaronitrile, 2-vinyl-5-ethyl-pyridine, ethylene sulfonic acid and its alkali metal salts, allyl sulfonic acid and its alkali metal salts and the like including other monomeric substances well known to the art capable of being copolymerized with acrylonitrile to form fiber-forming products.

While poly-N-vinyl-2-pyrrolidone may be employed with great advantage as the N-vinyl lactam polymer substrate, other N-vinyl lactam polymers may also be utilized with benefit in the practice of the present invention. These include poly-N-vinyl-5-methyl-2-pyrrolidone; poly-N-vinyl caprolactam; poly-N-vinyl-2-piperidone; poly-N-vinyl-3,3-dimethyl piperidone; and the like. The N-vinyl lactam polymers suitable for use in the practice of the present invention are of the generic structure:

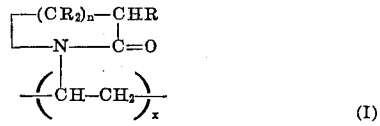

(I)

wherein $n$ is an integer from 2 to 4; $x$ is a plural integer, preferably one whose numerical value is greater than 5 or 10 to 50 or so and may be as large as 1000–2000 or more, and each R is independently selected from the group consisting of hydrogen and lower alkyl substituents, advantageously methyl and ethyl. The hydrogen (or other terminal units) which occur in homopolymeric and copolymeric N-vinyl lactam polymers which may be utilized in the practice of the present invention are not shown in the above generic formula since such details are readily understood by the artisan. Advantageously, the N-vinyl lactam polymers employed as the "backbone" trunk or substrate constituents for the fiber-forming graft copolymers prepared in the practice of the present invention have a number average molecular weight in the range from 10,000 to 20,000 or higher (as determinable from Fikentscher K-values from 5–10 or more to as high as 75 or 100 or so). Preferably, the N-vinyl lactam polymers employed for Fikentscher K-values between about 30 and 60. It is generally desirable for the quantity of the already formed N-vinyl lactam polymer that is employed to be an amount capable of providing between about 1 and 20 weight percent, more advantageously from about 5 to 15 weight percent, of the N-vinyl lactam polymer constituent in the graft copolymer product that is obtained.

Advantageously, hydrochloric acid is utilized for acidifying the zinc chloride solution in which the graft copolymer product is directly formed and from which it may be spun in the practice of the present invention. If desired, however, other acids which may be employed include phosphoric acid and other inorganic acids that do not precipitate zinc (such as sulfuric acid) or have other deleterious influence on the composition (such as nitric acid, which causes oxidation). When hydrochloric acid is employed, it is generally beneficial for it to be present in the composition in the amount between about 2–10 weight percent of hydrogen chloride, based on the weight of the aqueous zinc chloride solution that is employed. Such a concentration may be achieved by adding between about 7 and 30 weight percent of dissolved 12 N hydrochloric acid. Of course, when other inorganic acids are utilized, they should be present in quantities equivalent to those specified for hydrochloric acid.

The solubility of the N-vinyl lactam polymer in the acidified zinc chloride solution increases with the amount of acid present. Its solubility is also dependent somewhat on the quantity of acrylonitrile polymer present in the system as well as on the quantity of copolymerized monomer that is available in which the N-vinyl lactam polymer is generally soluble. Ordinarily, the N-vinyl lactam polymers have less solubility with increasing molecular weight.

It is ordinarily advantageous to employ sufficient quantities of the monomeric materials and the polymeric materials which are graft copolymerized to provide a fiber-forming composition containing between about 2 and 20 weight percent of dissolved or otherwise dispersed polymer in the resulting spinning solution. Usually, an amount of graft copolymerizable constituents sufficient to provide from 6 to 15 percent by weight of polymeric solids is even more advantageous. Frequently, it may be most suitable for the quantity of graft copolymerizable constituents that is employed to be adapted to provide from 8.5 to 11.5 percent by weight of fiber-forming polymer in the resulting spinning solution, taking into account the degree of monomer to polymer conversion that is obtained in the course of the polymerization.

The polymerization of the monoethylenically unsaturated acrylonitrile-containing monomeric material in the presence of the dissolved N-vinyl lactam polymer to form the graft copolymer-containing polymeric substance may be effected according to such various conventional techniques as may be suitable in particular instances. While the polymerized product may sometimes be entirely or nearly soluble without gel formation or other undesirable characteristics in the saline solutions employed, the excrescence of certain monomeric materials during their graft copolymerization as a chemically attached chain to the N-vinyl lactam polymer substrate may yield a graft copolymer in the polymerized product which is not completely soluble in the saline solution. However, as has been indicated even with such an occurrence in the compositions which are prepared according to the method of the present invention, the graft copolymer-containing product is discretely obtained as an extremely fine and uniform dispersion, generally in the form of liquid droplets distributed uniformly throughout the saline solvent phase, which generally does not interfere with the spinnability of the composition through ordinary fiber-shaping orifices or with the fiber-forming characteristics of the system. The compositions of the present invention may usually be utilized in a conventional manner to prepare high quality fibers and the like in which the desired increase in dye-receptivity has been improved by incorporation of the N-vinyl lactam polymer substrate for the graft copolymer constituent of the composition.

The fiber-forming systems of the present invention may be spun most conveniently into fibers and the like according to procedures and techniques which are commonly practiced with fiber-forming compositions that are comprised of zinc chloride saline solutions. Thus, by way of illustration, they may be coagulated in more dilute aqueous solutions of zinc chloride and may then be processed after coagulation according to conventional techniques of washing, stretching, drying, finishing, and the like. If it is desired or preferred, however, other methods which may be suitable for spinning or extruding such compositions into fibers and related articles may also be employed, or, as indicated, the articles may be cast or otherwise formed into desired filamentary or film products.

The essential feature and advantage in the practice of the present invention lies in the form in which any graft copolymer of the polymerized acrylonitrile or acrylonitrile-containing monomer mixture on the N-vinyl lactam polymer substrate comes out of the aqueous saline zinc chloride solution when it is not entirely soluble therein. Poly-N-vinyl lactams, such as poly-N-vinyl-2-pyrrolidone, are not, in and of themselves, soluble in polyacrylonitrile-dissolving aqueous solutions of zinc chloride. They are soluble, however, in the acidified solvent. While a mixture of the zinc chloride solvent with monomeric acrylonitrile is a solvent for the N-vinyl lactam polymers, the graft copolymeric product formed in such a system generally comes out as a dispersion of solid particles during polymerization which is more difficult to maintain in a uniform condition and which may occasion difficulties during the spinning operation. On the other hand, when the solvent is acidified prior to addition of the N-vinyl lactam polymer, the resulting graft copolymer that is obtained is either soluble or comes out as a dispersion in the characteristic form of liquid droplets. Such a composition, as is readily apparent, is more uniform and easier to handle during the spinning operation and tends to provide better fibers and the like shaped articles than compositions in which a less advantageous dispersion of the graft copolymer is present.

The invention is further illustrated in and by the following examples in which, unless otherwise indicated, all parts and percentages are to be taken by weight.

*Example 1*

About 0.1 gram of poly-N-vinyl-2-pyrrolidone (PVP) with an average molecular weight of about 350,000 and a Fikentscher K-value of about 60 was dispersed in 10 ml. of an aqueous 60 percent zinc chloride solution. After this, 12 N hydrochloric acid was added in increments to the dispersion until dissolution of the PVP was effected. This began after 0.8 ml. of the HCl was added.

In another experiment, about 0.1 gram of the same PVP was first dissolved in about 1.0 ml. of 12 N HCl to which there was incrementally added a 60 percent aqueous solution of zinc chloride. The resulting PVP-containing acidified zinc chloride solution remained clear until about 14.5 ml. of the zinc chloride solution had been added. At this point, a faint turbidity was noted.

*Example 2*

A dilute solution of polyacrylonitrile (having an intrinsic viscosity "$\eta$" of about 1.7) in aqueous 60 percent zinc chloride was prepared containing about 1½ percent of the polymer dissolved therein. To 50 ml. of this solution there was added about 0.1 gram of PVP with an average molecular weight of about 90,000 and 6 ml. of 12 N HCl. The PVP was completely dissolved. To 25 ml. of this solution there was added 10 ml. of 60 percent aqueous zinc chloride solution saturated with zinc oxide. (A saturated concentration of zinc oxide in an aqueous 60 percent zinc chloride solution at room temperature is about 1.9 grams of the oxide per 100 grams of the saline solution.) No precipitate was formed. To about 17 ml. of the treated solution were added an additional 5 ml. of the zinc oxide solution whereupon the PVP precipitated.

*Example 3*

Three samples were prepared to determine the solubility of PVP in a polymerizing acrylonitrile medium. The results are indicated in the following tabulation. In each of the samples, the PVP (average M.W.—350,000) was first dissolved in the HCl after which the zinc chloride was added, followed by addition of the acrylonitrile and hydrogen peroxide. Polymerization was conducted at 50° C. All three samples turned turbid within a few hours.

| Sample | Grams PVP | Ml. 12N HCl | Ml. 60 Percent Aq. ZnCl$_2$ | Ml. Acrylonitrile | Ml. 5 Percent Aq. H$_2$O$_2$ |
|---|---|---|---|---|---|
| "3A" | 0.155 | 1.0 | 10.0 | 2.8 | 0.1 |
| "3B" | 0.0798 | 1.0 | 10.0 | 2.8 | 0.1 |
| "3C" | 0.214 | 1.5 | 10.0 | 2.8 | 0.1 |

*Example 4*

The procedure of Example 3 was duplicated excepting to employ 79 percent aqueous zinc chloride as the solvent vehicle for each of the samples. After polymerization, each of the solutions remained clear.

*Example 5*

Five samples were prepared according to the method of

Example 3. Ten ml. of 65 percent aqueous zinc chloride; 2.8 ml. of acrylonitrile; 0.1 ml. of hydrogen peroxide; and about 0.1 gram of PVP (M.W. 350,000) were used in each sample. The quantity of 12 N HCl added to each sample is listed below.

| Sample: | Ml. of HCl |
|---|---|
| "5A" | 1.0 |
| "5B" | 1.5 |
| "5C" | 2.0 |
| "5D" | 3.0 |
| "5E" | 4.0 |

Samples "5A," "5B" and "5C" became slightly turbid within a few hours, turning distinctly turbid overnight. Samples "5D" and "5E" showed very slight turbidity after standing overnight.

Example 6

In about 348 parts of a 60 percent aqueous solution of zinc chloride there was dissolved about 76 parts of 12 N HCl; about 2 parts of PVP having a molecular weight of about 200,000; about 46 parts of acrylonitrile; and, as a catalyst, about 3 parts of a 5 percent aqueous solution of hydrogen peroxide. The PVP had a Fikentscher K-value of about 47. The mixture was polymerized with good product yield at a temperature of about 50° C. for a period of time of about 16 hours.

The composition, which had only very slight turbidity, was separated into three individual samples designated "6A," "6B" and "6C," respectively) which were then wet-spun into fibers according to a conventional technique using about a 45 percent by weight aqueous solution of zinc chloride as the coagulating spin bath and a 60-hole spinnerette having individual round orifice diameters of about 6 mils. After extrusion and coagulation, the fibers from each of the wet-spun samples were stretched to lengths greater than that of their original extruded lengths for orientation and washed thoroughly with water. They were then irreversibly dried at about 150° C. to obtain the desired fiber products.

The resulting approximately 2 denier fibers all had good physical properties and were all readily dyed to deep and level shades of coloration with Calcodur Pink 2BL (Colour Index 353). The fibers were dyed with 4 percent Calcodur Pink 2BL in the conventional manner, after which their numerical reflectance values in the dyed state were determined. The reflectance value of a fiber, which is a relative comparison of the amount of light reflected from a dyed sample with that reflected from a standard white tile reflector (having an arbitrarily assigned reflectance value of 316), is a characteristic given in numerical units that correspond to the relative amount of light from a standard source which is reflected from the dyed samples. Lower reflectance values in a sample dyed with a given dyestuff under given conditions are generally taken as an indication of better dye-receptivity in the fiber.

In the subsequent table there are set forth the specific conditions under which each of the Samples "6A," "6B" and "6C" were spun into fibers, as well as certain of the characteristics and properties (including Calcodur Pink 2BL reflectance values) of the resulting graft copolymer-containing fiber products:

In addition, the graft copolymer fiber product is readily dyeable by conventional techniques to deep and level shades of coloration with such dyestuffs as Amacel Scarlet BS (American Prototype No. 244 or Colour Index Direct Red 1 or 11110), Sulfanthrene Red 3B (Colour Index Vat Violet 2), Xylene Milling Black 2B (Colour Index Acid Black 26A), Brilliant Green Crystals (Colour Index Basic Green 1), and the like.

Results similar to those obtained in the foregoing may be achieved using other of the N-vinyl lactam polymers that have been mentioned as substrates for the graft copolymers and when mixtures containing predominant proportions of acrylonitrile with such monomeric materials as vinyl acetate; methyl acrylate, 2-vinyl pyridine; dimethyl aminoethyl acrylate; methacrylonitrile; methacrylamide; acrylic acid; and ethyl acrylate are polymerized in the presence of N-vinyl lactam polymers dissolved in the acidified saline solvent.

What is claimed is:

1. Method for preparing graft copolymer-containing fiber-forming systems which comprises acidifying, with between about 2 and 10 weight percent of hydrogen chloride, based on the weight of the resulting solution, an aqueous, polyacrylonitrile-dissolving, solution of zinc chloride that contains at least about 55 weight percent, based on the weight of the solution, of zinc chloride; dissolving in said acidified solution (a) at least about 80 weight percent, based on the total weight of polymerizable constituents, of a monoethylenically unsaturated monomeric material that is polymerizable with acrylonitrile and actually contains at least a predominant proportion of acrylonitrile and (b) between about 20 and 1 weight percent, based on the weight of polymerizable constituents, of a normally solid N-vinyl lactam polymer consisting of recurring units of the structure:

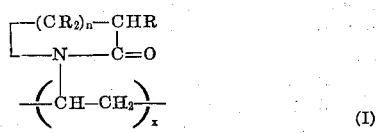

(I)

wherein $n$ is an integer from 2 to 4; $x$ is an integer between about 5 and about 2000; and each R is independently selected from the group consisting of hydrogen, methyl and ethyl; then polymerizing the dissolved monomeric material in the presence of the dissolved N-vinyl lactam polymer to form a fiber-forming graft copolymer-containing polymeric substance in spinnable dispersion in said acidified zinc chloride solution.

2. The method of claim 1, wherein said aqueous, polyacrylonitrile-dissolving solution of zinc chloride is acidified with 12 N hydrochloric acid.

3. The method of claim 1, wherein the monoethylenically unsaturated material is essentially acrylonitrile.

4. The method of claim 1, wherein the N-vinyl lactam polymer is poly-N-vinyl-2-pyrrolidone.

5. The method of claim 1, wherein the monoethylenically unsaturated monomeric material comprises acrylonitrile which is employed in a sufficient quantity to obtain a resulting polymerized substance, including the graft co-

| Sample | Coagulating Bath Temp., °C. | Stretch Ratio | Condition of Sample Tested | Denier | Tenacity, gms./D | Elong., Percent | Yield Point, gms. | Young's Modulus | Calcodur Pink 2BL Reflectance Values [a] |
|---|---|---|---|---|---|---|---|---|---|
| "6A" | 15 | 11.0 | Dry | 2.5 | 2.6 | 52 | 0.72 | 42 | 4.1 |
|  |  |  | Wet | 2.7 | 1.7 | 44 | 0.35 | 18 | [b] |
| "6B" | 16 | 15.5 | Dry | 2.1 | 3.6 | 45 | 0.88 | 43 | [c] |
|  |  |  | Wet | 2.1 | 2.3 | 40 | 0.38 | 22 | [b] |
| "6C" | 18 | 12.1 | Dry | 2.1 | 3.4 | 47 | 0.77 | 39 | 30.2 |
|  |  |  | Wet | 2.7 | 1.7 | 65 | 0.29 | [b] | [b] |

[a] The difference in reflectance values was attributed to the results caused by differences in coagulating bath temperatures.
[b] Value not determined.
[c] Value not determined. Presumed to be at least as low as 30.

polymer which is formed, which has in the polymerized substance at least about 80 weight percent of polymerized acrylonitrile.

6. The method of claim 1, wherein the aqueous solution of zinc chloride is comprised of about 60 parts by weight of zinc chloride and about 40 parts by weight of water.

7. The method of claim 1, and including, in addition thereto and in combination therewith, the sequential step of extruding said fiber-forming, graft copolymer containing spinnable dispersion into a shaped article in a coagulating liquid for said spinnable dispersion.

8. A spinnable, fiber-forming composition comprised of between about 2 and 20 weight percent, based on the weight of the composition, of a polymeric substance comprised of fiber-forming acrylonitrile polymer of monoethylenically unsaturated monomeric material containing at least about 80 weight percent of acrylonitrile in polymerized form, and graft copolymers of acrylonitrile and of acrylonitrile and any other monoethylenically unsaturated monomeric material copolymerizable with acrylonitrile upon an N-vinyl lactam polymer substrate consisting of recurring units of the structure:

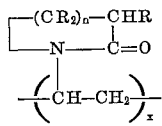   (I)

wherein $n$ is an integer from 2 to 4; $x$ is an integer between about 5 and about 2000; and each R is independently selected from the group consisting of hydrogen, methyl and ethyl; said polymeric substance containing polymerized therein between about 1 and 20 weight percent, based on the weight of the polymerized substance, of said N-vinyl lactam polymer substrate; said polymeric substance being uniformly and thoroughly dispersed in an aqueous, polyacrylonitrile-dissolving zinc chloride solution that contains at least about 60 weight percent, based on the weight of the solution, of zinc chloride and between about 2 and 10 weight percent, based on the weight of acidified solution, of hydrogen chloride.

9. A composition as set forth in claim 8, containing between about 6 and 15 percent by weight, based on the weight of the composition, of said polymeric solids.

10. A composition as set forth in claim 9, containing between about 5 and 15 percent by weight, based on the weight of polymeric substance in said composition, of said N-vinyl lactam polymer substrate.

11. A composition as set forth in claim 8, wherein said polymeric solids are dispersed in the form of liquid droplets in said acidified aqueous saline solution.

12. A composition as set forth in claim 8, wherein the N-vinyl lactam polymer is poly-N-vinyl-2-pyrrolidone.

13. A composition as set forth in claim 8, wherein the N-vinyl lactam polymer is poly-N-vinyl-2-pyrrolidone and wherein the polymeric substance has about 90 weight percent of acrylonitrile polymerized therein.

References Cited by the Examiner

UNITED STATES PATENTS

| 2,648,647 | 8/1953 | Stanton et al. | 260—29.6 |
| 2,837,492 | 6/1958 | Stanton et al. | 260—29.6 |
| 2,949,435 | 8/1960 | Davis et al. | 260—29.6 |

MURRAY TILLMAN, *Primary Examiner.*

LEON J. BERCOVITZ, *Examiner.*